(12) United States Patent
Schondorf et al.

(10) Patent No.: US 7,383,911 B2
(45) Date of Patent: Jun. 10, 2008

(54) WIRELESS SEATBELT BUCKLE SWITCH HARVESTING ENERGY AND METHOD THEREFOR

(75) Inventors: Steven Yellin Schondorf, Dearborn, MI (US); Kristin Marie Schondorf, Dearborn, MI (US); Ted Selker, Arlington, MA (US); Scott Howard Gaboury, Ann Arbor, MI (US); Thomas Michael McQuade, Ann Arbor, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 709 days.

(21) Appl. No.: 10/605,281

(22) Filed: Sep. 19, 2003

(65) Prior Publication Data

US 2005/0061568 A1 Mar. 24, 2005

(51) Int. Cl.
*B60R 21/00* (2006.01)
(52) U.S. Cl. .................................................. 180/268
(58) Field of Classification Search ............... 180/268; 280/801.1, 808
See application file for complete search history.

(56) References Cited

U.S. PATENT DOCUMENTS

| 5,483,221 A | 1/1996 | Mutter et al. |
|---|---|---|
| 5,552,789 A | 9/1996 | Schuermann |
| 5,571,253 A | 11/1996 | Blackburn et al. |
| 6,038,895 A | 3/2000 | Menke et al. |
| 6,059,066 A | 5/2000 | Lary |
| 6,323,566 B1 | 11/2001 | Meier |
| 6,362,734 B1 | 3/2002 | McQuade et al. |
| 6,688,700 B2* | 2/2004 | Gupta et al. ............ 297/452.18 |
| 2002/0070635 A1 | 6/2002 | Morrison et al. |
| 2002/0074898 A1 | 6/2002 | Maue et al. |
| 2004/0036345 A1* | 2/2004 | Herberg et al. ............. 297/480 |
| 2004/0066291 A1* | 4/2004 | Tracy ...................... 340/457.1 |
| 2004/0119599 A1* | 6/2004 | Stevenson et al. ........ 340/686.1 |
| 2004/0124741 A1* | 7/2004 | Morrison et al. ........... 310/314 |

* cited by examiner

*Primary Examiner*—Faye M. Fleming
(74) *Attorney, Agent, or Firm*—Frank MacKenzie

(57) ABSTRACT

A device (20) for an automotive vehicle (10) is provided to indicate the buckled and unbuckled status of a seatbelt (24). The device (20) has a self-powered wireless switch assembly (22) that is coupled to the seatbelt (24). It provides power to power a wireless transmitter (44) to transmit a wireless signal (45) corresponding to the buckled and unbuckled state of the seatbelt (24). The self-powered wireless switch assembly (22) harvests energy from the mechanical action of the seatbelt (24). The device (20) transmits a wireless signal (45) indicating the seatbelt (24) status. The receiver (18) located in the automotive vehicle (10) receives the wireless signal (45). The wireless signal (45) is processed by a safety information system (12) and then visually and audibly displayed by an indicator (16) to alert the driver of the seatbelt (24) status.

24 Claims, 2 Drawing Sheets

WIRELESS SEATBELT BUCKLE SWITCH HARVESTING ENERGY AND METHOD THEREFOR

BACKGROUND OF INVENTION

The present invention generally relates to seatbelt systems for automotive vehicles and, more particularly, to seatbelt usage indication systems for automotive vehicles.

The automotive industry has experienced significant growth with onboard safety information systems, also referred to as cabin communication systems. These systems help the vehicle operator better assess the status of the various vehicle conditions. Some of the vehicle conditions include inside temperature, door ajar, and seatbelt buckling. When a condition changes, the system alerts the operator with an audible, and or, a visual alarm transmitted from the onboard safety information systems. The onboard safety information system includes smaller systems that monitor specific conditions; such as identifying, among other things, the location of buckled and unbuckled seatbelts when the vehicle is in operation. The seatbelt indication system is one such system.

The seatbelt indication system can relay the information to the onboard safety information system or send the information directly on to the indication system to alert the operator. With the seatbelt indication system, the operator receives an alert identifying that seatbelts are, or are not, in use. The seatbelt indication system includes a sensor that gathers the seatbelt status from a sensor wired into the vehicle's cable harness and mounted on each seatbelt buckle assembly.

The cable harness is used to connect the seatbelt sensor to the seatbelt indication system. The cable harness provides power for the sensor. The cable harness also provides a continuous communication connection to send the seatbelt status to any other subsystem that might need the information.

For each seatbelt sensor connection, the associated cost to supply power and a communication link is proportional to the number of connections made. Furthermore, the routing of wires to transfer power or data is very difficult in a customer friendly way when the connection is to a foldable or removable seat. Also, each seatbelt sensor added increases the input ports needed to connect to the systems input circuitry in the seatbelt indication system.

A cable harness may prove to be unreliable where the seat is foldable or removable due to user error in the disengagement and engagement of a cable connection. The cable harness is more prone to wear or damage when routed to foldable and or removable seats. Also, the system may prove to be inoperable where the user might simply forget to reconnect a cable after disengaging it. Other means of making electrical contact connection with the sensor for a removable seat could be employed at or near the place where the seat connects to the floor, but these means would also be prone to contamination and abuse. It would be advantageous to provide seatbelt sensor that is not wired into a cable harness, but could still communicate seatbelt status to the seatbelt indication system.

In another configuration for removable seats, as disclosed in U.S. Pat. No. 6,362,734, the onboard safety information system gathers the seatbelt status from a non-contact data link. The non-contact data link consists of a closely adjacent non-powered transceiver/transponder connection. This non-powered wireless connection is comprised of a transponder and transceiver. The transponder is coupled to the removable seat and is electrically connected with the seatbelt sensors. The transceiver is attached to the automotive vehicle and electrically connected with the seatbelt indication system or other similar systems, as mentioned above. The transceiver is located in the vehicle so that it will be closely adjacent to the transponder when the removable seat is placed back into the automotive vehicle after removal. The closely coupled position between the transceiver and transducer must be maintained in order for the transducer to receive the radiated energy from the transceiver sufficient to power it. If the transceiver and transponder are not properly located adjacent to each other, then the non-powered transponder will not receive enough radiated energy necessary to send a signal back to the transceiver.

Also, each non-contact data link requires a transceiver/transponder set. And each transceiver requires a connection to the seatbelt indication system that increases the cost and system complexity if a transceiver/transponder is used at every seating location in the automotive vehicle.

In view of the above, it would be advantageous to have a self-powered wireless switch assembly that transmits the unbuckled or buckled status of the seatbelt not being dependent upon a closely coupled wireless or hardwired connection. It would also be beneficial to have the identity of the self-powered wireless switch assembly identifiable at the source. The final advantage would be to have a system that requires only one receiver to receive the status of one or more self-powered wireless switch assemblies onboard an automotive vehicle.

SUMMARY OF INVENTION

The device is a self-powered wireless switch assembly that harvests mechanical energy from the latching action of the seatbelt buckle. The device may also harvest radiant radio frequency energy from an in-vehicle wireless network. The harvested energy is used to power a wireless transmitter that may transmit a signal containing status information about each seatbelt to a single receiver. A visual or audible indication is created from the processed signal that alerts the vehicle operator to the status of each buckled or unbuckled seatbelt.

Briefly, one embodiment of the invention includes a seatbelt connected to a seat that is situated inside an automotive vehicle. The automotive vehicle is equipped with an onboard safety information system having a seatbelt status system. The seatbelt status system, in its simplest form, includes a receiver to receive signals coming from the device and an indicator panel to display alert messages to the driver of the vehicle. One of the onboard sensors that transmit a signal to the seatbelt status system is a device. The device is comprised of a self-powered wireless switch assembly coupled to a seatbelt. The seatbelt has a buckled state, and or, an unbuckled state. The self-powered wireless switch assembly comprises a switch, indicating buckle state, a wireless transmitter, to generate a signal corresponding to the buckled state or unbuckled state of each seatbelt, and an energy harvesting arrangement, to power the wireless transmitter. The self-powered wireless switch assembly is self-contained in each seatbelt.

One application of the embodiment using the device is in an automotive vehicle having a single receiver, an indicator, and one or more devices. Because the self-powered wireless switch assembly is self-contained in each seatbelt, there may be any number of devices in the automotive vehicle. Although multiple receivers to receive the signal may be utilized, only a single receiver is required to receive each wireless signal transmitted by each of the devices onboard the automotive vehicle. Where the receiver then relays the signal to the indicator. Then the indicator may visually and/or audibly alert the vehicle driver to the seatbelt status.

DETAILED DESCRIPTION

In the figures, the same reference numbers denote like elements. Embodiments of the present invention are suitable for many systems. For example, the device having a seatbelt and a self-powered wireless switch assembly transmits a signal that may be received by a receiver. This receiver may be located in various locations such as in another vehicle, in a key fob or in an automotive vehicle. The received signal by the receiver being used to identify seatbelt status of the automotive vehicle.

Figure 1:
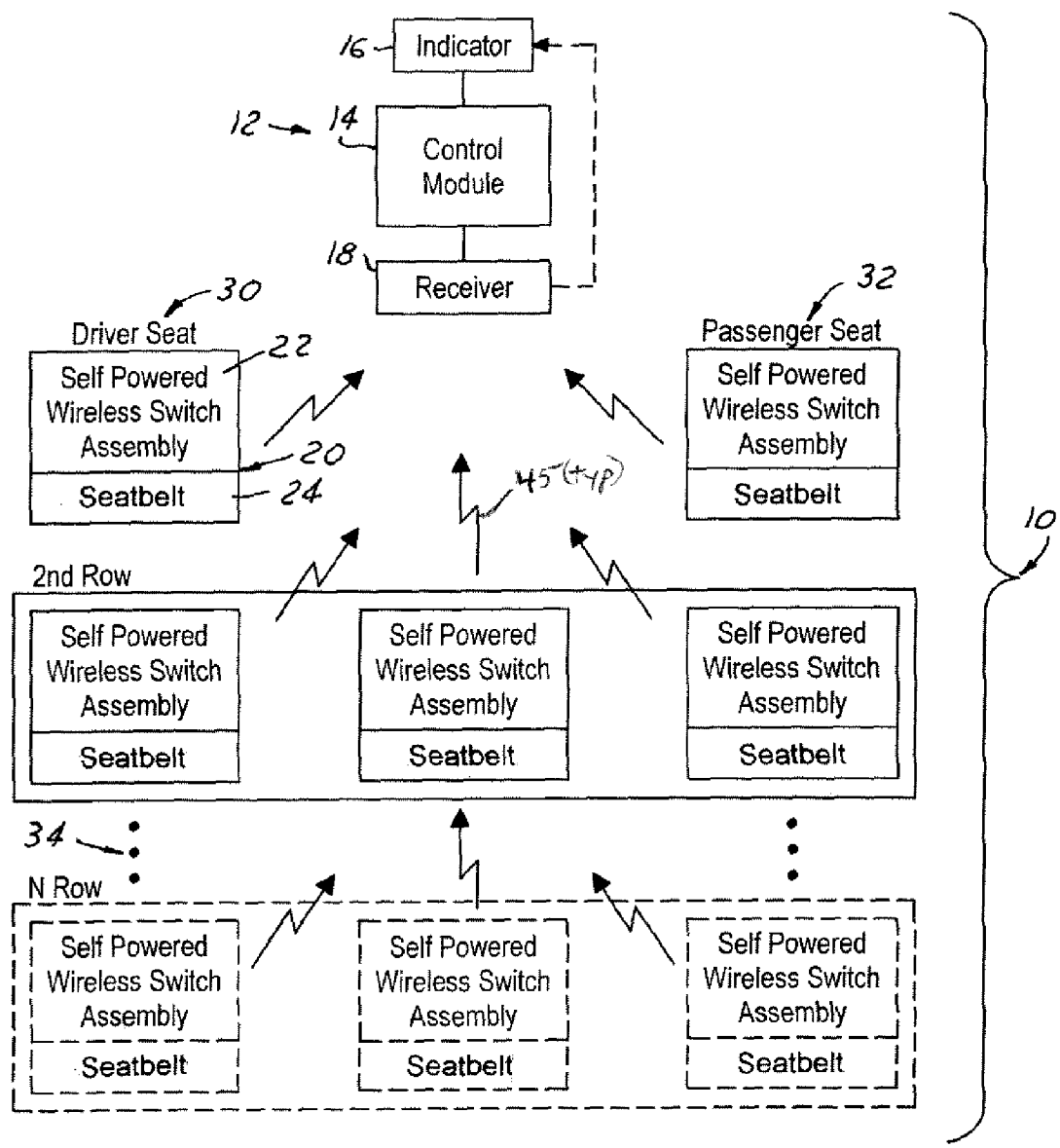
FIG. 1 is a block diagram of the device in an automotive vehicle.

FIG. 1 illustrates an automotive vehicle 10 having a safety information system 12 and a device 20. The automotive vehicle 10 has a driver seat 30, a passenger seat 32, and occupant seats 34. Each of the seats 30, 32, 34 of the automotive vehicle 10 has a seatbelt 24.

The safety information system 12 includes a control module 14. The control module 14 processes information coming from the receiver 18 and transmits a command to an indicator 16 that alerts the occupants. However, the receiver 18 may be electrically coupled to the indicator 16 allowing the control module 14 to be bypassed.

Information transferred from the receiver 18 to the control module 14 may include any vehicle state whether it be safety or systems related. In this embodiment the information being sent from the receiver 18 may include, in any combination, among other possibilities; location of a seatbelt, the buckled status of a seatbelt, and the unbuckled status of a seatbelt each representing a particular state transmitted by the device 20. Communication among the receiver 18, control module 14, and the indicator 16 may be digital or analog communication or other communication means known to one in the art.

The device 20 is comprised of a self-powered wireless switch assembly 22 and a seatbelt 24. The self-powered wireless switch assembly 22 is coupled to the seatbelt 24. Each seatbelt 24 may have an identity programmed into a memory (as described below) and may have a seatbelt status. The status of the seatbelt 24 is determined by the buckled or unbuckled state of the seatbelt 24 each time the seatbelt 24 is operated. The self-powered wireless switch assembly 22 may then transmit the status. The status transmitted by the self-powered wireless switch assembly 22 is a wireless signal 45 to be received by the receiver 18. The receiver 18 receives a wireless signal 45 from the self-powered wireless switch assembly 22 that is a component of the device 20. The transmitted wireless signal 45 may include the various states of the device 20. And each device 20 transmits its own wireless signal 45. The wireless signal 45 is transmitted in any compatible frequencies known to one in the art.

The wireless signal 45 in the present embodiment is an RF signal. While the invention has been described in connection with respect to an RF wireless signal, one skilled in the art will appreciate that the invention is not necessarily so limited and that other wireless signals may be used for transmission of the signal. These include optical signals such as infrared. The RF signal received by the receiver 18 is processed and an indicator signal is generated to control the display of the indicator 16 to apprise the driver of the status of the seatbelt 24 of each seating location.

The device 20 is a self-contained unit; consequently, there may be any number inside of the automotive vehicle 10 attached to seating locations requiring a safety or lap seatbelt. The device 20 may be installed on all or any combination of occupant seating locations, including the driver seat 30, the passenger seat 32, and or, any occupant seat 34, including occupant seating in each additional seat or additional row of the automotive vehicle 10, such as in passenger vans. The device 20 may be installed on removable seating location, non-removable seating location, and foldable seating locations eliminating the deficiencies associated with hardwired seatbelt indicators and non-powered close coupled wireless seatbelt indicators. The back removable seat in a sport utility is one example of a removable seat. The second row seat in other sport utility vehicles exemplifies a foldable seat. The embodiment would include a device 20 being adjacently mounted for each seating location within the automotive vehicle 10.

In this embodiment, the automotive vehicle 10 has a single receiver 18. The receiver 10 may be positioned within the vehicle to receive the wireless signal 45 from any number of devices 20 in the automotive vehicle 10. Although not needed, multiple receivers may be positioned throughout the automotive vehicle 10 as desired. Having a single receiver 18 reduces costs of attendant wiring connections to the receiver.

Figure 2:
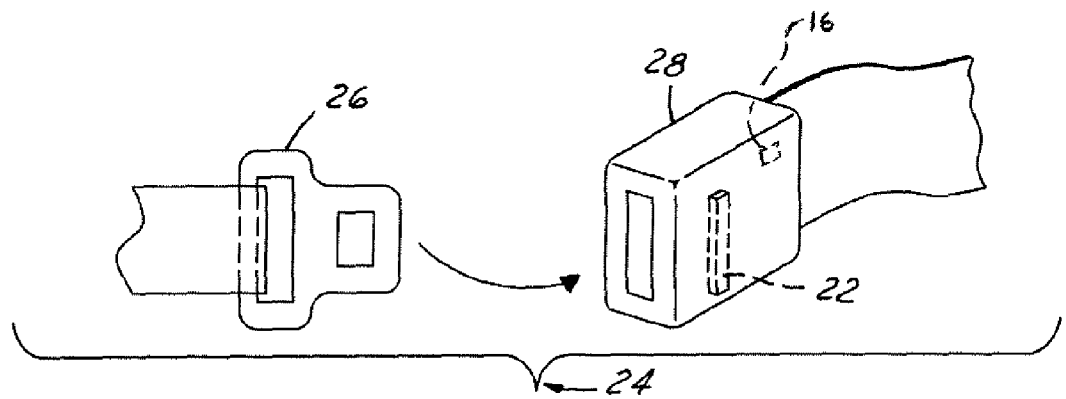
FIG. 2 is a perspective view of a first embodiment of a device.

Referring now to FIG. 2, one embodiment of the present invention is illustrated. The device 20 is comprised of a seatbelt 24 (shown unbuckled) and a self-powered wireless switch assembly 22. The seatbelt 24 consists of two component sides, a latching or buckle side 28 and a tongue side 26. The self-powered wireless switch assembly 22 in this embodiment is coupled to the buckle side 28 of seatbelt 24. The coupling location of the self-powered wireless switch assembly 22 to the buckle side 28 of seatbelt 24 is only exemplary.

Figure 3:
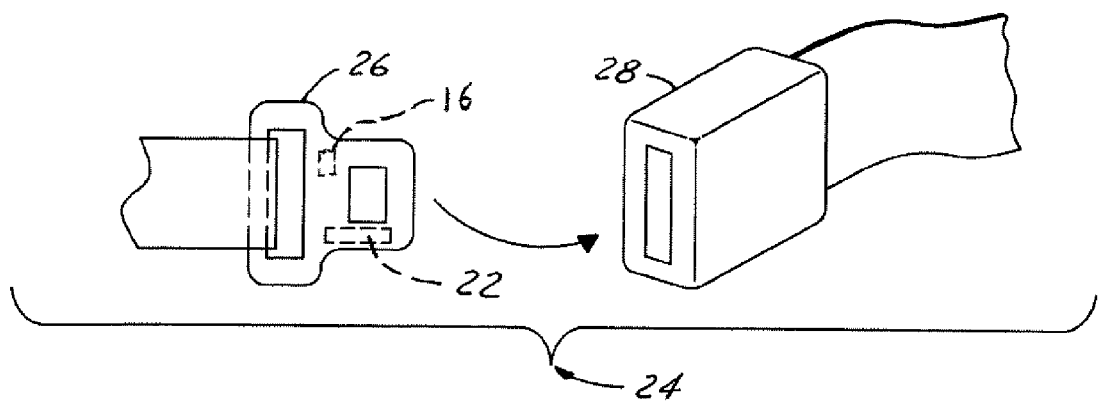
FIG. 3 is a perspective view of a second embodiment of the invention.

Referring now to FIG. 3, a second embodiment of the invention is illustrated. In this embodiment the self-powered wireless switch assembly 22 is coupled to the tongue side 26 of seatbelt 24 (shown unbuckled). The coupling location of the self-powered wireless switch assembly 22 to the tongue side 26 of seatbelt 24 is only exemplary.

Figure 4:
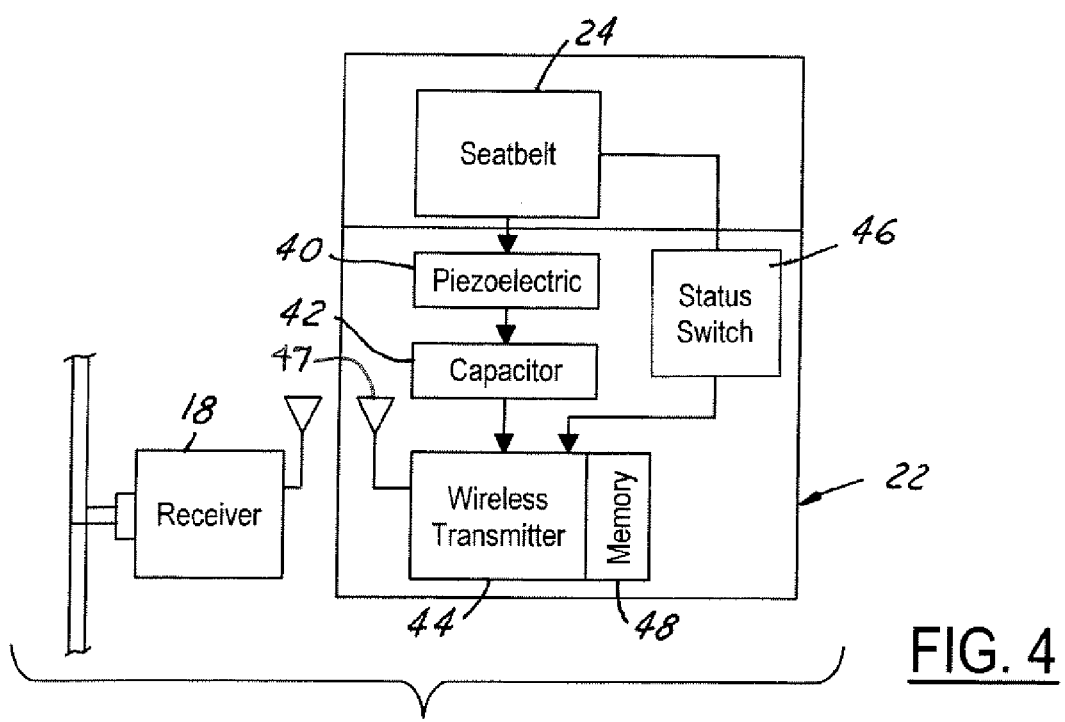
FIG. 4 is a block diagram showing the elements of the device and a receiver.

Referring now to FIG. 4 the device 20 is depicted transmitting a signal to a receiver 18. The receiver 18 being any receiver connected to an automotive vehicle 10 or any other device interested in receiving the signal transmitted by the device 20. The receiver 18 may be a standalone receiver or another receiver of the vehicle such as a remote keyless entry receiver or a radio receiver.

In FIG. 4, the device 20 includes a seatbelt 24 and a self-powered wireless switch assembly 22. The seatbelt 24 has a status switch 46 coupled thereto and transmits the buckle status to the wireless transmitter 44 of the self-powered wireless switch assembly 22. The status switch 46 indicates when the seatbelt 24 is in a buckled state or an unbuckled state. The buckle state is integrated into the wireless transmitter 44 and may be stored in memory 48. Also, the location of the seatbelt 24 may be stored into the memory 48. The wireless transmitter 44 transmits through an antenna 47 a wireless signal 45 that comprises the state of the status switch 46 and any other optional information, such as seatbelt location, if stored in the memory 48.

The self-powered wireless switch assembly 22 is powered by harvesting energy from the mechanical action of the seatbelt 24. The preferred embodiment contemplates a piezoelectric material 40 used to harvest the mechanical energy. The piezoelectric material 40 harvests the energy from the latching action of the seatbelt 24. The piezoelectric material 40 converts available mechanical energy into a voltage that charges a capacitor 42. The capacitor 42 may then be used to power the wireless transmitter 44. The energy harvesting conversion occurs when the seatbelt 24 distresses the piezoelectric material 40 when the seatbelt 24 is latched or unlatched. Energy harvesting may be accomplished in other ways as known to those in the art.

Alternatively, energy harvesting may be accomplished by capturing the stray radiant radio frequency energy from an in-vehicle wireless network, such as IEEE's 802.11b wireless network or other similar in-vehicle wireless networks. The antenna 47 or circuitry in the seat (not shown) is used to capture the stray radiant radio frequency energy and harvest this energy to create a useable local power source for the self-powered wireless switch assembly. This power being used to charge a capacitor or other storage type available when the device transmits the seatbelt status.

Transmission of the seatbelt status may occur upon latching and or unlatching of the seatbelt, at a pre determined time, or upon a request signal initiated elsewhere.

Figure 5:
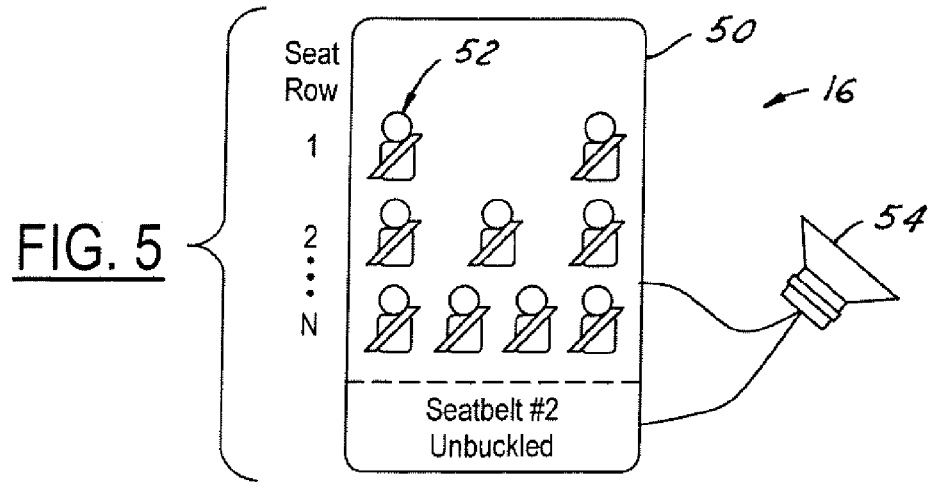
FIG. 5 is a display for providing an indication of seatbelt buckle state in symbolic form or audible form.

Referring now to FIG. 5, one possible example of an indicator 16 is illustrated. The indicator 16 may be a symbol 52 or audible indicator 54 for alerting the vehicle operator to the status of the seatbelt 24. The display 50 may have a separate symbol 52 representing each of seating positions in each of the n rows. Each symbol 52 may be separately and selectively illuminated to provide a warning or indication that the seat belt at that position which was originally secured has become unsecured. It is also possible for the symbols 52 to be illuminated in a first color during normal conditions when the seat belt at that position has been fastened, and transition to a second color, such as red, when that seat belt transitions to an unsecured condition. The entire display 50 may be illuminated as a test at initial switch on of the vehicle ignition, as is well known in the art. Also, the display 50 may have a text message indication.

In operation, the device 20, includes a seatbelt 24 and a self-powered wireless switch assembly 22, that is mounted adjacent to or mounted to an occupant seat 34 within the automotive vehicle 10. The vehicle occupant sits on an occupant seat 34 and uses the device 20 to buckle or unbuckle the seatbelt 24 about him. The action, by the occupant, of buckling or unbuckling the seatbelt 24 causes the self-powered wireless switch assembly 22 to be powered by harvesting mechanical energy. This power may be used to transmit a wireless signal 45 indicative of the buckle state. Optimally, each seating location 30,32,34 will have a device 20 that is mounted adjacent to or mounted to it.

The self-powered wireless switch assembly 22 is powered by the mechanical energy harvested when the seatbelt 24 causes the piezoelectric material 40 to be distressed by the latching action of the occupant. The distressed piezoelectric material 40 converts available mechanical energy into a voltage that charges a capacitor 42. The capacitor 42 may then power a wireless transmitter 44 that transmits a wireless signal 45. The wireless signal 45 transmitted by the wireless transmitter 44 may include an identifier for the device 20 stored into the memory 48 and the buckle status indicated by the status switch 46. The status switch 46 indicates that the buckle status is buckled when the seatbelt 24 is fastened and is unbuckled when the seatbelt 24 is unfastened.

The automotive vehicle 10 having a safety information system 12 receives the wireless signal 45 transmitted by the device 20. The wireless signal 45 is received by a receiver 18 of the safety information system 12 onboard the automotive vehicle 10. Using the indicator 16 of the safety information system 12, the signal received by the receiver 18 is conditioned by the control module 14 and transferred to a display 50 having an audible indicator 54 or a symbol 52 that is activated to alert the driver of the changed status of the seatbelt 24. The automotive vehicle 10 may have additional receivers 18 and or additional indicators 16 The safety information system 12 receives each wireless signal 45 from each device 20 within the automotive vehicle 10. The safety information system 12 may be initialized to identify each device 20 by the location stored in the memory 48 of the device 20. In this embodiment, the alert given to the driver of the automotive vehicle 10 may be seat location specific. Typical warnings could be audible, indicating the location of the seatbelt 24 that is buckled or unbuckled. The warnings could be visually indicated upon a display 50 showing a symbol 52 indicative of the seatbelt 24 being buckled or unbuckled and the location of the seatbelt 24.

Additionally, as shown in FIG. 2 and alternatively in FIG. 3, the indicator 16 may be directly positioned upon or located locally near the seatbelt 24 receiving the status of the seatbelt 24 directly from the self-powered wireless switch assembly 22. The self-powered wireless switch assembly 22 directly transfers the status of the seatbelt 24 to the indicator 16. The indicator 16 may apprise the driver or other occupants of the status with an audible chime or visible light. The audible chime may be of a varying tune or frequency for each seatbelt 24 located within the automotive vehicle 10.

Thus, while embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A device for an automotive vehicle comprising:
   a seatbelt having a buckled state and an unbuckled state;
   a self-powered wireless switch assembly coupled to the seatbelt, the self-powered wireless switch assembly comprising an energy harvesting element generating electrical power, a capacitor storing power received from the energy harvesting element, and a wireless transmitter transmitting a wireless status signal corresponding to the buckled state and the unbuckled state;
   a receiver receiving a wireless signal; and
   an electrical request signal generated by the receiver requesting the wireless status signal.

2. The device of claim 1 wherein the energy harvesting element comprises a piezoelectric material.

3. The device of claim 1 wherein the energy harvesting element comprises an antenna capturing stray radiant radio frequency energy.

4. The device of claim 1 wherein the signal comprises a seatbelt location identifier.

5. The device of claim 1 wherein the self-powered wireless switch assembly is coupled to a buckle side of said seatbelt.

6. The device of claim 1 wherein the self-powered wireless switch assembly is coupled to a tongue side of said seatbelt buckle.

7. An automotive vehicle comprising:
a seat;
a seatbelt mounted adjacent to said seat;
a device comprising said seatbelt having a buckled state and an unbuckled state, a self-powered wireless switch assembly coupled to the seatbelt, the self-powered wireless switch assembly comprising an energy harvesting element generating electrical power, a capacitor storing power received from the energy harvesting element, and a wireless transmitter transmitting a wireless status signal corresponding to the buckled state and the unbuckled state;
a receiver receiving the wireless status signal and generating an electrical status signal corresponding to the wireless status signal;
an indicator coupled to the receiver to display the electrical status signal; and
a request signal generated by the receiver wherein the wireless status signal is transmitted in response to receiving the request signal.

8. The automotive vehicle of claim 7 wherein the energy harvesting element includes a piezoelectric device.

9. The automotive vehicle of claim 7 wherein the seat is removable.

10. The automotive vehicle of claim 7 wherein the seat is non-removable.

11. The automotive vehicle of claim 7 wherein the seat is foldable.

12. The automotive vehicle of claim 7 further comprising a plurality of receivers.

13. The automotive vehicle of claim 7 wherein the receiver communicates wirelessly with the indicator.

14. The automotive vehicle of claim 7 further comprising a control module for conditioning the electrical status signal received from the receiver and the conditioned electrical status signal to the indicator.

15. A method of using a device in an automotive vehicle comprising:
coupling a seatbelt comprising a tongue side to a buckle side;
generating power from an energy harvesting element in response to coupling;
storing the power in a capacitor;
generating a seatbelt status and a seatbelt identification in response to the coupling;
powering a transmitter with the stored power;
transmitting a wireless signal comprising the seatbelt status and the seatbelt identification;
receiving the wireless signal in a receiver;
generating an alert message indicative of the seatbelt status and the seatbelt identification; and
receiving a request signal, wherein transmitting the wireless signal in response to receiving the request signal.

16. The method of claim 15 wherein transmitting the wireless signal comprises a seatbelt identification and a seatbelt status.

17. The method of claim 15 wherein the energy harvesting element is a piezoelectric material.

18. The method of claim 15 wherein transmitting the wireless signal comprises a second seatbelt identification and a second seatbelt status.

19. The method of claim 15 wherein transmitting the wireless signal comprises a plurality of seatbelt identifications and a plurality of seatbelt statuses.

20. A device for an automotive vehicle comprising:
a seatbelt having a buckled state and an unbuckled state;
a self-powered wireless switch assembly coupled to the seatbelt, the self-powered wireless switch assembly comprising an energy harvesting element generating electrical power, a capacitor storing power received from the energy harvesting element, and a transmitter transmitting a electrical status signal corresponding to the buckled state and the unbuckled state;
an indicator coupled to the self-powered wireless switch assembly, the indicator receiving the electrical status signal and generating an indication corresponding to the electrical status signal; and
a request signal generated by the receiver wherein the wireless status signal is transmitted in response to receiving the request signal.

21. The device of claim 20 wherein the self-powered wireless switch assembly further comprises a wireless transmitter transmitting a wireless status signal corresponding to the buckled state and the unbuckled state.

22. A device for an automotive vehicle comprising:
a seatbelt having a buckled state and an unbuckled state; and
a self-powered wireless switch assembly coupled to the seatbelt, the self-powered wireless switch assembly comprising an energy harvesting element generating electrical power, a receiver receiving a request signal and generates an electrical request signal corresponding to the request signal, and a wireless transmitter transmitting a wireless status signal corresponding to the buckled state and the unbuckled state in response to receiving the request signal and having a seatbelt identification and a seatbelt status.

23. The device of claim 22 wherein the energy harvesting element comprises a piezoelectric material.

24. The device of claim 22 wherein wireless status signal comprises a seatbelt identification and a seatbelt status.

* * * * *